United States Patent [19]

Koeller

[11] 4,146,351
[45] Mar. 27, 1979

[54] DRAFT TUBE VENTING ARRANGEMENT

[75] Inventor: Paul Koeller, Dorval, Canada

[73] Assignee: Dominion Engineering Works Limited, Lachine, Canada

[21] Appl. No.: 845,545

[22] Filed: Oct. 26, 1977

[30] Foreign Application Priority Data

Nov. 26, 1976 [CA] Canada .................................. 266668

[51] Int. Cl.² ............................................ F01D 25/30
[52] U.S. Cl. .................................... 415/116; 415/119; 60/696
[58] Field of Search ............... 415/116, 117, 119, 500; 60/686, 689, 696

[56] References Cited

U.S. PATENT DOCUMENTS

| 2,262,191 | 11/1941 | Moody | 415/116 |
| 2,300,748 | 11/1942 | Rheingans | 60/689 |

Primary Examiner—Louis J. Casaregola
Attorney, Agent, or Firm—R. A. Eckersley

[57] ABSTRACT

Hydraulic turbo machines are provided with air admitting and inducing arrangements in the draft tube, below the runner. This permits the admission of air in flow stabilizing relation, particularly at partial loads so as to diminish noise, vibration and cavitation, and to stabilize machine operation.

7 Claims, 6 Drawing Figures

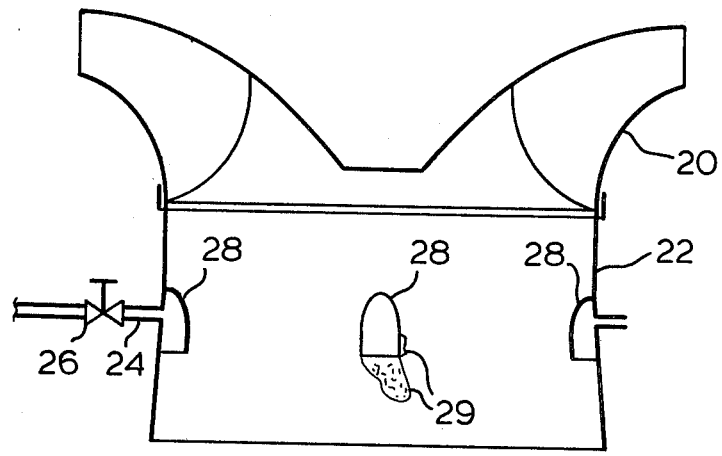
FIG. 1 (PRIOR ART)
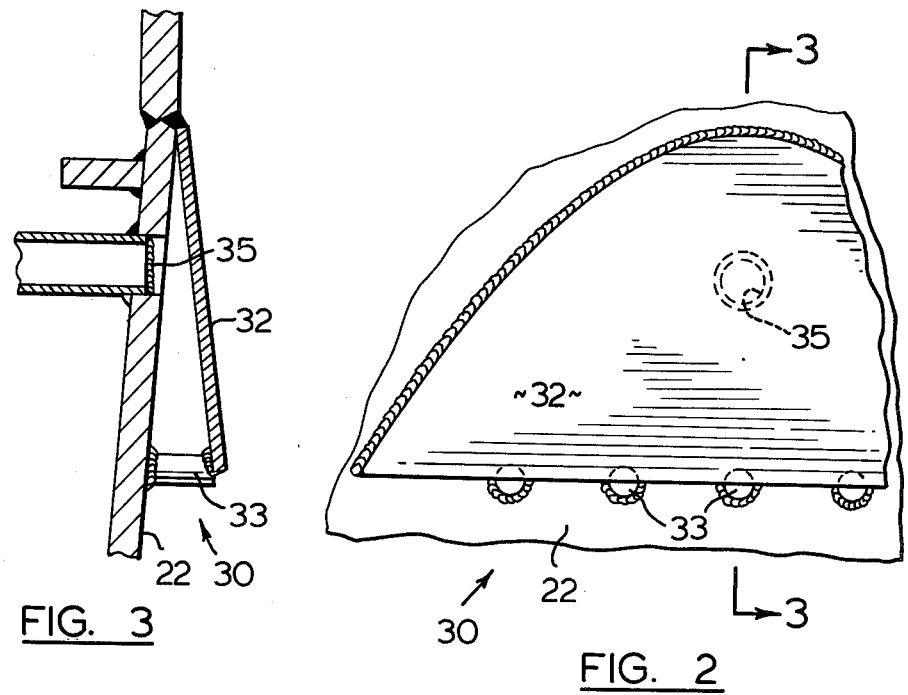
FIG. 3
FIG. 2

DRAFT TUBE VENTING ARRANGEMENT

This invention is directed to hydraulic turbo machines such as turbines and pump-turbines, and in particular to improved means for admitting air to the draft tube of such machines.

In the operation of hydraulic turbo machines such as pump-turbines, and turbines of the Francis type a number of problems arise associated with operation at part load and overload.

Owing to variations in system power requirements it is often desirable to operate individual hydraulic turbo machines at power settings other than the design optimum.

Under such modes of operation the conditions of flow within the draft tube downstream of the runner depart significantly from the stable full flow condition associated with the optimum or design point. Instead, free vortices may be formed, having an air or vaporous core, and rotating as a "rope" in the same direction or opposite to the direction of rotation of the runner, and at different frequency. This creates low and high frequency pressure fluctuations, resulting in objectionable noise and sometimes to component failure due to fatigue.

Previous efforts in the prior art have included the provision of many types of structure to stabilize flow such as ribs, fins, tripod and coaxial diffusers, transverse air pipes etc. These prior art components project into the draft tube, causing obstructions to normal flow and can serve to generate secondary noise and cavitation phenomena.

In accordance with arrangements set forth in some prior applications it has been found that operation using injected air or aspiration of air is possible, leading to enhanced flow characteristics, with more ready achievement of full load.

The present invention provides a turbo-hydraulic machine having a runner rotatably mounted within a casing, a draft tube connected to the casing for the passage of working liquid therethrough in energy exchanging relation with the runner, air supply means extending through the wall of the draft tube to the interior thereof to at least one air chamber located within the draft tube, having a low profile cross-section and a diffusion outlet opening into the draft tube in the direction of flow of the working liquid.

Certain embodiments of the present invention are described, reference being made to the accompanying drawings, wherein:

FIG. 1 is a showing of the prior art, being a schematic diametrical cross-section indicative of a Francis type machine with air supply to the draft-tube;

FIG. 2 is an elevational view of a first embodiment of a flat plate aeration chamber in a portion of a draft tube;

FIG. 3 is a sectional view at 3—3 of FIG. 2;

Figure 4:
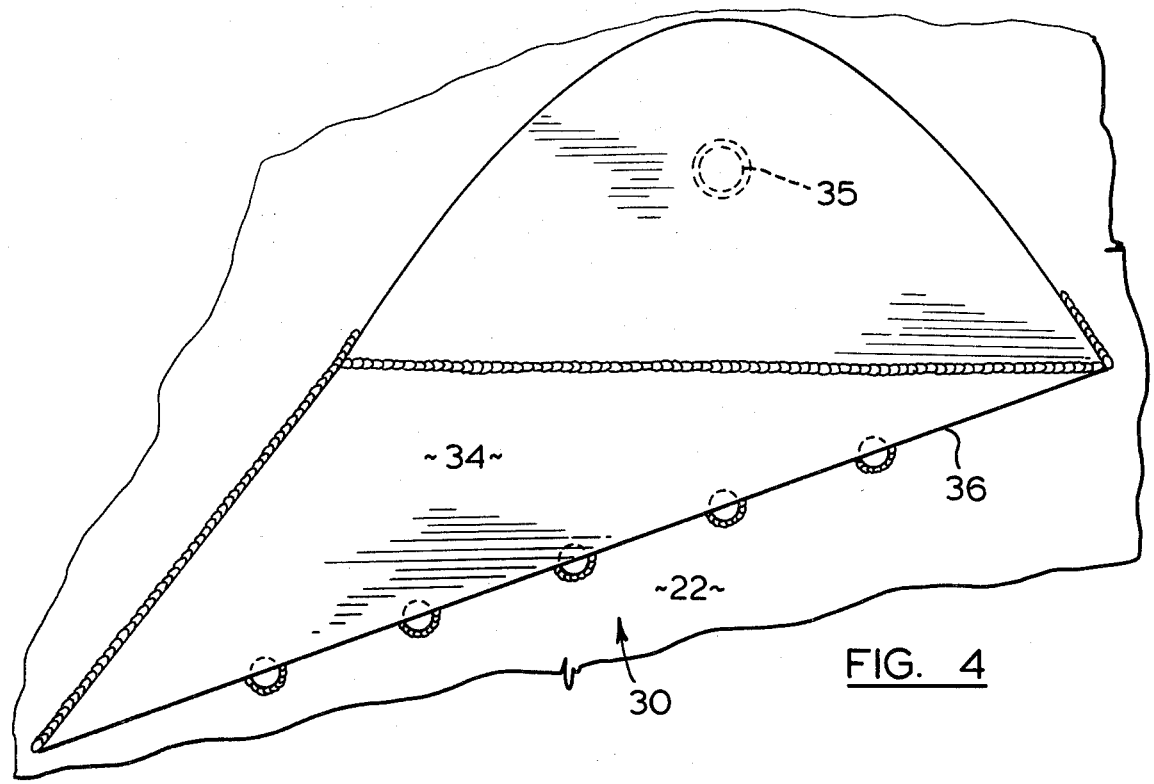
FIG. 4 is a view similar to FIG. 2 of a second embodiment.

FIG. 1 is a purely schematic arrangement showing a runner silhouette 20, and a draft tube silhouette 22 incorporating a pressurized air supply comprising a source of compressed air supplying pipe 24 by way of throttle valve 26, having one or more entries 28 through the wall of the draft tube 22, each comprising a portion of a standard elbow. Beneath and to one side of one such elbow is shown a visula indication 29 symbolic of cavitation damage. In a known installation according to the prior art, the resonance taking place in the machine, despite the air supply has been sufficient to cause damage to stuffing box components on the main shaft.

In accordance with the present invention a first embodiment, shown in FIGS. 2 and 3 is a "flat plate" aeration chamber 30 within the draft tube 22, comprising a flat plate 32 of parabolic shape and suitable thickness having the curved upper edge portion of the plate 32 welded in sealing relation to the inner surface of the draft tube 22. The expansion ratio provided by the subject chamber 30 in relation to the air supply inlet 35 in one practical embodiment was in excess of 20 to 1. A plurality of suitable braces 33 secure the lower or outlet edge of plate 32 to the inner surface of draft tube 22.

In FIG. 4 this second embodiment is provided with an inclined skirt segment 34 to provide an inclined outlet edge 36 which is particularly suited in installation wherein the direction of rotation of the vaporous "rope" is known, so as to minimize the tendency of water, flowing with a rotational component from the rope, from entering the chamber is appropriately increased, while the eduction effect and period of eduction also is enhanced Owing to the natural eduction effect of these embodiments, the necessity of using a pressurized air supply may be avoided.

Figures 5, 6:
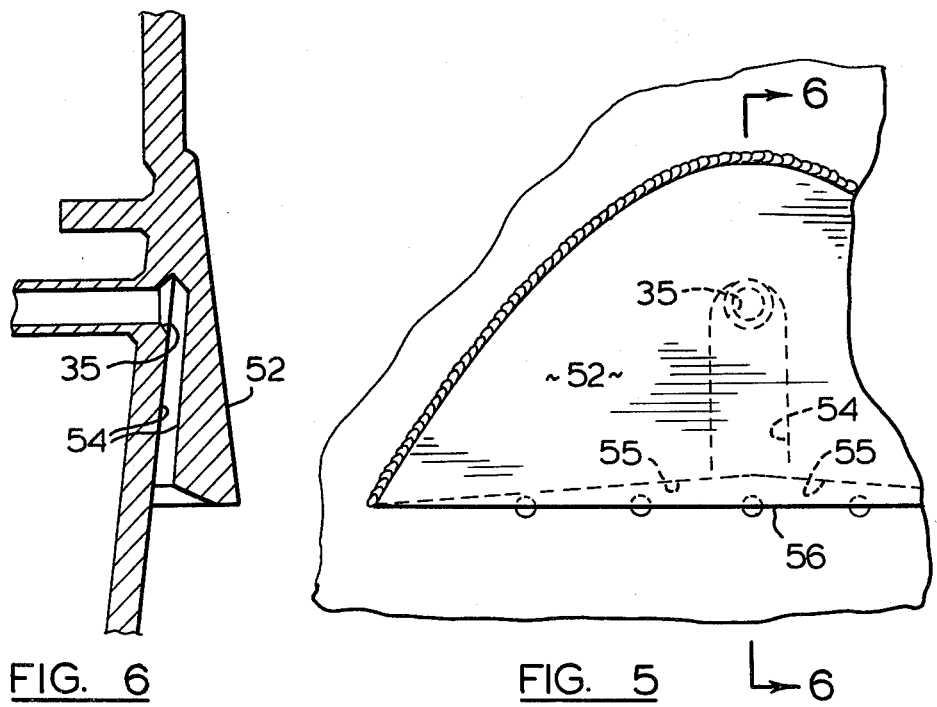
FIG. 5 is a like view of a third embodiment.
FIG. 6 is a sectional view at 6—6 of FIG. 5.

In the third embodiment illustrated in FIGS. 5 and 6 the plate 52 is cast or otherwise fabricated to provide vertical channel or passage walls 54 extending downwardly from the inlet 35 to divergent walls 55, providing in combination with the plate edge 56 an expansion chamber of high expansion ratio and low capacity, whereby the entry of water in flooding relation within the aeration device is restricted in volume and extent.

In these illustrated embodiments, the provision of a check valve (not shown) in the air supply line, even in the case of natural aspiration, will seal the respective chambers and create compression of air therein when any tendency occurs for water to rise up within the aeration chamber. Thus the period and quantity of water entrapment within the respective chambers may be accordingly limited, to enhance the effectiveness of the air chambers.

It has been found in practice that the presently disclosed arrangement provides highly satisfactory aeration whereby the part load running characteristics of the machine are noticeably enhanced, the full load capability is more readily achieved, and machine dependability is enhanced. The arrangement is comparatively low in cost and possesses advantageous characteristics with promis of few if any cavitation problems.

In assessing the contribution afforded by the present invention as distinct from the air admission arrangements of the prior art, it must be borne in mind that the available energy present in the draft tube flow can be as much as 10% of the machine rating, amounting to power in the order of 6000 HP. It will be appreciated that conversion of but a small percentage of this power in a destructive mode will very rapidly destroy intrusive elements within a draft tube, and such overwhelming destructive power has in fact been observed.

What I claim as new and desire to secure by Letters Patent of the United States is:

1. In a turbo-hydraulic machine having a stationary casing, a runner rotatably mounted therein, supply passage means to admit working liquid to the machine for passage in energy exchanging relation with the runner and a draft tube to receive working liquid on passage through the runner, the improvement comprising air supply means, at least one air chamber located within the draft tube having a low profile cross-section and a diffusion outlet opening into the draft tube in the direction of flow of the working liquid, the ratio of cross-sectional area of said diffusion outlet opening to the cross-sectional area of said air supply means at said air chamber having a value of 20:1 or greater.

2. The machine as claimed in claim 1, said diffusion outlet extending about a segmental portion of the inner periphery of said draft tube being bounded by a substantially flat plate extending as a chord of the respective cross-section of said draft tube.

3. The machine as claimed in claim 2, said substantially flat plate having an area of substantially parabolic form, being secured to the inner surface of said draft tube by the parabolically curved surface of said parabolic form.

4. The machine as claimed in claim 2, said flat plate being inclined outwardly from the surface of said draft tube, towards the axis of the tube in the direction of flow of said working liquid and said air.

5. The machine as claimed in claim 2, said air supply means extending through the wall of said draft tube to a location positioned high within said chamber, and air passage means within said chamber of restricted cross-section extending downwardly to said diffusion outlet.

6. In a turbo-hydraulic machine having a stationary casing, a runner rotatably mounted therein, supply passage means to admit working liquid to the machine for passage in energy exchanging relation with the runner and a draft tube to receive working liquid on passage through the runner, the improvement comprising air supply means, at least one air chamber located within the draft tube having a low profile cross-section and a diffusion outlet opening into the draft tube in the direction of flow of the working liquid, the mouth thereof being in a plane inclined at an angle from a plane extending normal to the draft tube main axis.

7. The machine as claimed in claim 6, said angle of inclination being in the range 10°–30°.

* * * * *